Jan. 17, 1956 W. J. BURNELL 2,731,154

AUTOMATIC RELIEF VALVE FOR FILTERS

Filed April 2, 1952

INVENTOR.
William John Burnell
BY
Barlow & Barlow
ATTORNEYS

United States Patent Office 2,731,154
Patented Jan. 17, 1956

2,731,154

AUTOMATIC RELIEF VALVE FOR FILTERS

William John Burnell, Cardiff, Wales, assignor to Fram Corporation, a corporation of Rhode Island Application April 2, 1952, Serial No. 280,035

1 Claim. (Cl. 210—166)

This invention relates to liquid filters having a by-pass valve which opens automatically when excessive pressure develops across the filter medium, and has for its primary object to provide a liquid filter having a simple yet reliable form of by-pass valve which will operate when pressure above a certain value is provided.

A further object of the invention is to provide a liquid filter with a by-pass valve which can be readily constructed to operate at a substantially predetermined pressure and which is to a large extent independent of accuracy in manufacture of the component parts of the valve.

With these and other objects in view, the invention consists of certain novel features of construction, as will be more fully described and particularly pointed out in the appended claim.

Figure 1:
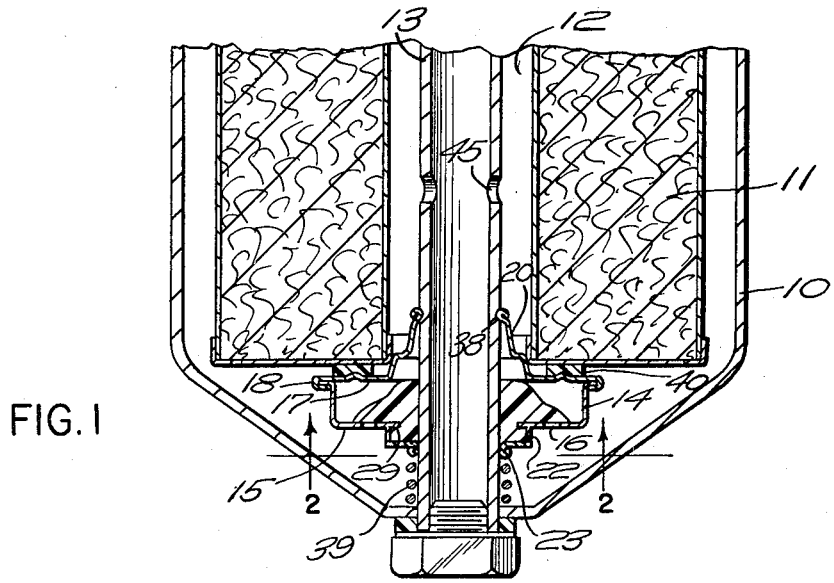
Fig. 1 is a sectional view of a fragmental portion of a filter casing and cartridge showing the by-pass valve in position.
Figure 2:
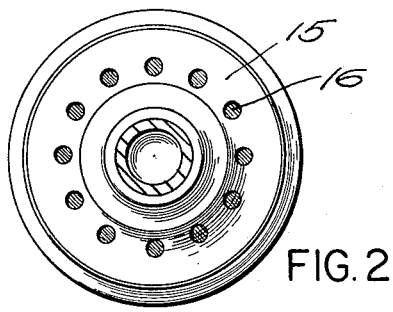
Fig. 2 is a sectional view on line 2—2 of Fig. 1 with the casing and filter element omitted.

In accordance with the present invention, the by-pass valve comprises an annular body of rubber or like resilient material having an annular cantilever portion which normally covers an aperture or apertures through which liquid may flow to by-pass the filter medium and which flexes to uncover said aperture or apertures when excessive pressure develops across the filter medium.

The valve body may be mounted in a housing which serves to support a filter element or cartridge within the filter casing and one form of liquid filter according to the invention having a filter cartridge supported in this manner will now be described.

The filter comprises a casing 10 in which is housed a filter cartridge 11 having an axial passageway therethrough or discharge chamber 12. A center tube 13 extends through the passageway, being spaced from the wall thereof, and receives the filtrate at opening 45 from the cartridge and discharges it from the filter casing. The center tube extends through the valve body and its housing which are located at one end of the cartridge.

The valve housing comprises a cup-shaped member 14, the end wall 15 of which is centrally apertured and has a series of circumferentially-arranged holes 16 and a retainer member 17 comprising a centrally apertured annular base, the outer periphery of which is spun over as at 18 an outwardly-extending flange 19 on the side wall of the cup-shaped member to secure the retainer member to the cup-shaped member, and an inwardly and axially-extending tubular shank 20 which is stepped down at 21 to provide the reduced portion shown and having the lugs 37 that engage the center tube 13. Extending outwardly and axially from the end wall of the cup-shaped member is a short tube 22 which receives snugly the center tube and which has at its free end a plurality of outwardly-extending lugs or hooks 23.

Figure 4:
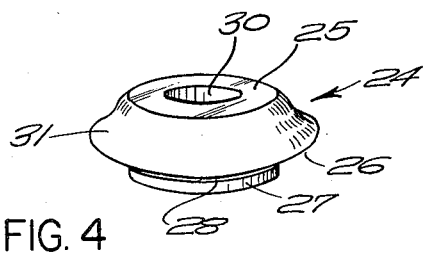
Fig. 4 is a perspective view of the valve body shown in Fig. 1.

The valve body 24 as shown in Figs. 1 and 4 is generally annular and has parallel end walls 25 and 26 with a neck portion 27 extending beyond the end wall 26 in which there is an annular slot 28 for receiving the inner peripheral portion 29 of the end wall of the cup shaped member of the valve housing whereby the valve body is secured in such member. An opening 30 snugly receives the center tube preventing leakage of liquid between the center tube and the valve housing. The end walls are connected by an ogee section 31 which provides an outwardly extending cantilever portion covering the holes 16 in the end wall 15 of the cup.

Figure 3:
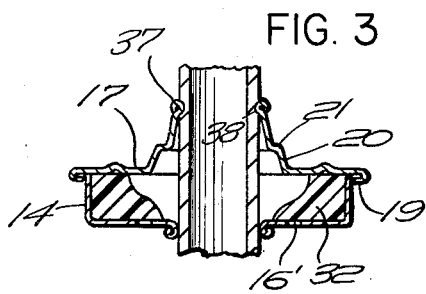
Fig. 3 is a sectional view of a modified form of valve.
Figure 5:
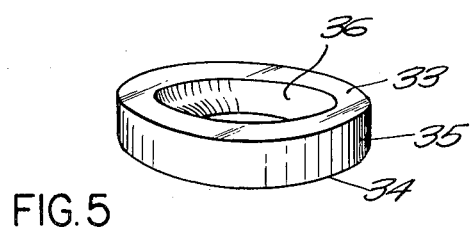
Fig. 5 is a perspective view of the valve body shown in Fig. 3.

The valve body 32 (Figs. 3 and 5) is annular and has parallel end walls 33 and 34 and a cylindrical outer side wall 35 which is a snug fit within the cup-shaped member of the valve housing. The inner side wall 36 of the valve is of ogee section and provides an inner and annular cantilever portion of gradually decreasing thickness towards the axis of the valve. The cantilever portion of the valve overlies the series of circumferentially-extending holes 16' in the base of the cup-shaped member of the housing and normally prevents passage of liquid through the apertures.

The free end of the tubular shank of the valve housing has a plurality of inwardly-extending lugs 37 that engage a recess 38 in the center tube provided by an annular groove formed about the center tube. The valve housing is urged inwardly by a spring 39 surrounding the center tube and seating against the adjacent end wall of the filter casing and bearing against the annular disk of the tube 22 fixed to end wall of the cup-shaped member. The said lugs or hooks 23 on the short tube extending from the cup-shaped member engage convolutions of the spring to secure the spring to the valve housing for the purpose of ease of assembly. The valve housing is sealed to the filter cartridge by a gasket 40 arranged between the adjacent end wall of the filter cartridge and the base of the retainer member.

In operation, liquid normally flows through the filter cartridge to the center tube, the valve body, which is a snug fit axially within the valve housing, preventing passage of liquid through the holes in the valve housing. When pressure across the filter cartridge becomes excessive, the cantilever portion of the valve body deflects axially, permitting liquid to flow into the valve housing and through the tubular shank thereof directly to the center tube. The operating pressure is a function of both the resiliency of the material of the valve body and the sectional shape of the cantilever portion thereof, which may be varied as desired. The valve body may be spring-loaded by a spring interposed between the valve body and the base of the retainer member and in this case the cantilever portion of the valve body could be relatively thin, the valve being arranged to open at a desired operating pressure by use of a spring of suitable strength.

I claim:

In a filter, a liquid-confining casing having a high pressure area and a low pressure area, a center tube communicating with the low pressure area and leading from the casing, a filter element surrounding said tube, by-pass valve means disposed between the high pressure and low pressure areas, comprising a valve housing encircling said tube and having a wall extending in a plane at right angle to the tube and having an opening in said wall for the passage of liquid from the high to the low pressure area, an annular body of flexible rubber-like material having a cantilever portion that rests on said wall and normally covers said opening and operable to flex away from said wall under a substantial liquid pressure to allow liquid to pass through said opening, said housing having a protruding annular flange, and said body having a neck provided with an annular slot adapted snugly to receive said flange and thereby anchor the body in operating position in the housing.

References Cited in the file of this patent

UNITED STATES PATENTS

| | | |
|---|---|---|
| 1,950,325 | Punte | Mar. 6, 1934 |
| 2,057,932 | Bosler | Oct. 20, 1936 |
| 2,132,770 | Weidenbacker | Oct. 11, 1938 |
| 2,133,575 | Rosenberg | Oct. 18, 1938 |
| 2,183,616 | Korte | Dec. 19, 1939 |
| 2,373,046 | Osborn | Apr. 3, 1945 |
| 2,542,254 | Lamb | Feb. 20, 1951 |
| 2,575,900 | Vokes | Nov. 20, 1951 |
| 2,617,535 | Hamilton | Nov. 11, 1952 |

FOREIGN PATENTS

| | | |
|---|---|---|
| 149,616 | Australia | Oct. 26, 1950 |